(12) United States Patent
Ramakrishna

(10) Patent No.: US 8,050,694 B2
(45) Date of Patent: Nov. 1, 2011

(54) METHOD AND SYSTEM FOR EXTENDING THE USE AND/OR APPLICATION OF MESSAGING SYSTEMS

(75) Inventor: Madhusudana Ramakrishna, Singapore (SG)

(73) Assignee: Affle Limited, London (GB)

( * ) Notice: Subject to any disclaimer, the term of this patent is extended or adjusted under 35 U.S.C. 154(b) by 812 days.

(21) Appl. No.: 11/816,089

(22) PCT Filed: May 19, 2006

(86) PCT No.: PCT/GB2006/001875
§ 371 (c)(1),
(2), (4) Date: Nov. 15, 2007

(87) PCT Pub. No.: WO2006/123174
PCT Pub. Date: Nov. 23, 2006

(65) Prior Publication Data
US 2008/0305774 A1    Dec. 11, 2008

(30) Foreign Application Priority Data
May 19, 2005    (GB) .................................. 0510255.3

(51) Int. Cl.
*H04W 4/00*    (2009.01)

(52) U.S. Cl. .......................... 455/466; 455/403; 455/410
(58) Field of Classification Search .................. 455/403, 455/410, 466
See application file for complete search history.

(56) References Cited

U.S. PATENT DOCUMENTS

| | | |
|---|---|---|
| 2004/0068440 A1 | 4/2004 | Porato |
| 2004/0237109 A1 | 11/2004 | Laitinen et al. |
| 2005/0021634 A1* | 1/2005 | Naim et al. .................. 709/206 |
| 2005/0215231 A1* | 9/2005 | Bauchot et al. ............. 455/405 |
| 2006/0069922 A1* | 3/2006 | Jelinek et al. ................ 713/186 |
| 2006/0218586 A1* | 9/2006 | Pohjolainen et al. .......... 725/39 |

FOREIGN PATENT DOCUMENTS

| | | |
|---|---|---|
| WO | WO 97/19568 | 5/1997 |
| WO | WO 02/21354 | 3/2002 |

* cited by examiner

*Primary Examiner* — Patrick Edouard
*Assistant Examiner* — Michael Irace
(74) *Attorney, Agent, or Firm* — Leason Ellis LLP

(57) ABSTRACT

A method for extending the use and/or application of messaging systems is disclosed. The method includes embedding non-standard data within a first portion of a header of a message, transmitting the message via the messaging system, and identifying the embedded non-standard data in the first portion of the header of the message and processing the message differently to messages without the non-standard data.

14 Claims, 4 Drawing Sheets

METHOD AND SYSTEM FOR EXTENDING THE USE AND/OR APPLICATION OF MESSAGING SYSTEMS

CROSS-REFERENCE TO RELATED APPLICATIONS

This application is a 35 USC §371 application of International Application No. PCT/GB2006/001875 filed May 19, 2006 which claims priority to Great Britain Application No. 0510255.3 filed May 19, 2005, both of which are hereby incorporated by reference in their entirety.

FIELD OF THE INVENTION

The present invention relates to a method and system in which messaging systems such as Short Messaging Service (SMS), Enhanced Messaging Service (EMS) or Multimedia Messaging Service (MMS) messaging systems are extended to support alternate uses or applications.

BACKGROUND TO THE INVENTION

Messaging systems such as the short messaging service (SMS) and the like are extremely popular types of text (or multimedia in the case of EMS and MMS) based communication provided by mobile telephone systems. However, by their very nature, their use is limited to their intended purpose.

The SMS communications protocol and implementation was designed to allow limited length alpha-numeric messages to be asynchronously transmitted relatively quickly between mobile telephones.

FIG. 1 illustrates a standard implementation of an SMS system. A Short Message Center (SMSC) stores and forwards messages to and from a mobile telephone (MS). A Short Message Entity (SME), which can be located in the fixed network or a mobile telephone, receives and sends SMS messages. A Mobile Switching Center (MSC) switches connections in a mobile telephone network between mobile telephones or between mobile telephones and the fixed network. The SMS gateway MSC (GWMS) is a gateway MSC that can also receive SMS messages. The gateway MSC is a mobile network's point of contact with other networks. On receiving the short message from the short message center, the GMSC typically uses an SS7 network to interrogate the current position of the mobile telephone from the home location register (HLR). The HLR is the main database in a mobile network. It holds information of the subscription profile of the mobile telephone and also about the routing information for the subscriber, i.e. the area (covered by a MSC) where the mobile telephone is currently situated. The GMSC is thus able to pass on the message to the correct MSC. A Visitor Location Register (VLR) corresponds to each MSC and contains temporary information about the mobile telephone, information like mobile telephone identification and the cell (or a group of cells) where the mobile telephone is currently situated. Using information form the VLR the MSC is able to switch the information (short message) to the corresponding Base Station System (BSS), which transmits the short message to the mobile telephone. The BSS consists of transceivers, which send and receive information over the air interface, to and from the mobile telephone. This information is passed over the signaling channels so the mobile telephone can receive messages even if a voice or data call is going on.

The SMS protocol used for encoding and transmission of SMS messages is described by GSM document 03.40. Whilst SMS messages are an extremely popular mechanism used for communication over mobile telephone networks, their use is limited by the implementation offered by the mobile telephone network provider. To date, most SMS systems offer basic text based communication for a fixed fee (dependent on the contract negotiated with the mobile telephone network provider).

STATEMENT OF THE INVENTION

According to an aspect of the present invention, there is provided a method for extending the use and/or application of messaging systems including:
  embedding non-standard data within a first portion of a header of a message;
  transmitting the message via the messaging system; and,
  identifying the embedded non-standard data in the first portion of the header of the message and processing the message differently to messages without the non-standard data.

The messaging system may comprise an SMS, MMS or EMS messaging system.

A further portion of the header may be set to a value causing at least part of said first portion of said header to be ignored by the messaging system.

Said first portion of said header may comprise a validity period field. Said non-standard data may comprise one or more of:
  data operative to cause application of a different charging tariff to the message;
  a charge to be raised against the account associated with the originating terminal of the message;
  instructions for performance of an action authorized by the originator of the message;
  a request for provision of a service to the originating terminal of the message.

Said non-standard data may comprise a link to a record in a remote repository, the method further comprising accessing the remote repository via said link and determining said processing required in dependence on the record.

Identifying the embedded non-standard data in the first portion of the header of the message and processing the message differently to messages without the non-standard data may include one of:
  dropping the message;
  replying to the originating terminal with an acknowledgement message; and,
  performing an action with reference to the stated recipient of the message.

The method may further comprise sending the message from a merchant, the non-standard data comprising a request for payment of a transaction and the transaction being at the request of the recipient of the message, wherein the step of identifying the embedded non-standard data in the first portion of the header of the message and processing the message differently to messages without the non-standard data further comprises identifying the request for payment of a transaction and prompting the recipient to authorize payment.

The method may further comprise entering data via a secure terminal enabling the merchant to send the message.

According to another aspect of the present invention, there is provided a messaging system arranged to receive messages and monitor for non-standard data embedded within a predetermined first portion of headers of said messages, wherein upon detection of non-standard data in said first portion of a header, the messaging system is arranged to process said message differently to messages without said non-standard data.

The messaging system may comprise an SMS, MMS or EMS messaging system.

A further portion of the header may be set to a value causing at least part of said first portion of said header to be ignored by the messaging system.

Said first portion of said header may comprise a validity period field. Said non-standard data may comprise one or more of:

data operative to cause said messaging system to apply a different charging tariff to the message;

data operative to cause said messaging system to raise a charge against the account associated with the originating terminal of the message;

instructions arranged to cause said messaging system to perform an action authorized by the originator of the message;

instructions arranged to cause said messaging system to provide a service to the originating terminal of the message.

The messaging system may further comprise a remote repository, wherein said non-standard data comprises a link to a record in said remote repository, the messaging system being arranged to access the remote repository via said link and determine said processing required in dependence on the record.

The messaging system may further comprise a merchant terminal and a user terminal, wherein upon performance of a transaction for said user, the merchant terminal is arranged to embed non-standard data comprising a request for payment of the transaction into the first portion of a header of a message and transmit said message to the user terminal, the messaging system being arranged to identify the embedded non-standard data in the first portion of the header of the message and prompt the user terminal for authorization to pay said transaction, wherein upon receipt of authorization to pay said transaction from said user terminal, the messaging system is arranged to charge an account associated with the user terminal.

The user terminal may comprise a mobile telephone.

The merchant terminal may further comprise a secure terminal arranged to accept an identifier identifying said user terminal, wherein the merchant terminal is arranged to transmit the message in dependence on the identifier.

The messaging system may further comprise a remote profile system and a client application, wherein upon installation of the client application on the user terminal, the client application is arranged to obtain profile data and populate a profile record in said remote profile system for the user.

If said user terminal includes an image capture device, the client application may be arranged to obtain an image of the user for said profile record, the merchant terminal being arranged to access said profile record and display an image of said user for authentication of the user during payment of said transaction.

Preferred embodiments of the present invention are directed to various methods and systems identified for extending the use and application of messaging systems such as SMS without requiring significant changes to the normal implementation provided by mobile telephone networks.

Embodiments of the present invention seek to make use of a validity period field in order to embed information meant to be recognized by applications other than the SMSC itself and for purposes other than determining the maximum length of validity of a particular SMS. Messages are altered so as to avoid clashes with standard processing and allow extended use messages to co-exist with standard messages.

We have presented a way to quickly associate transaction Information with a SMS. The method allows sorting through the large volume of SMS that a Mobile network processes and extraction only those that interest us for our transaction needs. We are able to associate simple billing information or even any arbitrary complex information relevant to our needs with an SMS.

Embodiments are applicable for many uses including billing, different service types or levels.

BRIEF DESCRIPTION OF THE DRAWINGS

Embodiments of the present invention will now be described, with reference to the accompanying drawings, in which.

DETAILED DESCRIPTION

Figure 2:
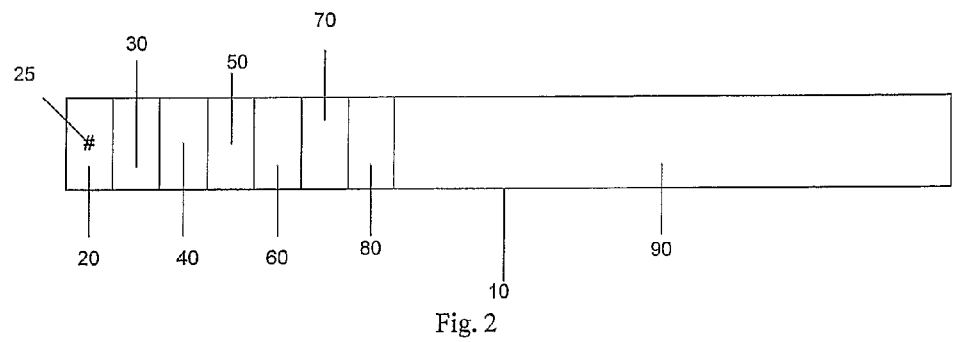
FIG. 2 is a block diagram illustrating fields of an SMS message according to an embodiment of the present invention.

FIG. 2 is a block diagram illustrating fields of a message according to an embodiment of the present invention. In this embodiment, an SMS message is used. However, it will be appreciated that other message types and corresponding messaging systems could be used.

The SMS message 10 includes a number of header fields 20-80 and a body field 90. The header fields comprise a validity-period field 20, a service-centre-time-stamp field 30, a protocol-identifier field 40, a more-messages-to-send field 50, a priority field 60, a messages-waiting field 70 and an alert-sc field 80.

The header fields are required by the SMS protocol and are used for routing messages etc. In preferred embodiments of the present invention, data 25 is embedded within the validity period field 20 and is used to identify non-standard SMS messages for special treatment during transmission and/or at the receiving mobile telephone.

The Validity-Period field 20 encodes the information element which gives an mobile telephone subscriber (MS) submitting an SMS-SUBMIT to the Service Centre (SMSC) the possibility to include a specific time period value in the short message (TP-Validity-Period field). The TP-Validity-Period parameter value indicates the time period for which the short message is valid, i.e. for how long the SMSC shall guarantee its existence in the SMSC memory before delivery to the recipient has been carried out.

Whilst embodiments of the present invention could be implemented by embedding data in other ones of the header fields 30-80, the validity-period field 20 is presently preferred since most known SMS system implementations do not actively observe/use data set within this field and instead enforce their own validity period without reference to that requested in the SMS message 10. In order to avoid possible problems of the validity period value set within the validity period field 20 being used by the SMSC, embodiments of the present invention include valid data in the validity period field 20 to ensure that an SMS message will not be invalidated due to the content of the embedded data in the validity period field 20.

Figure 1:
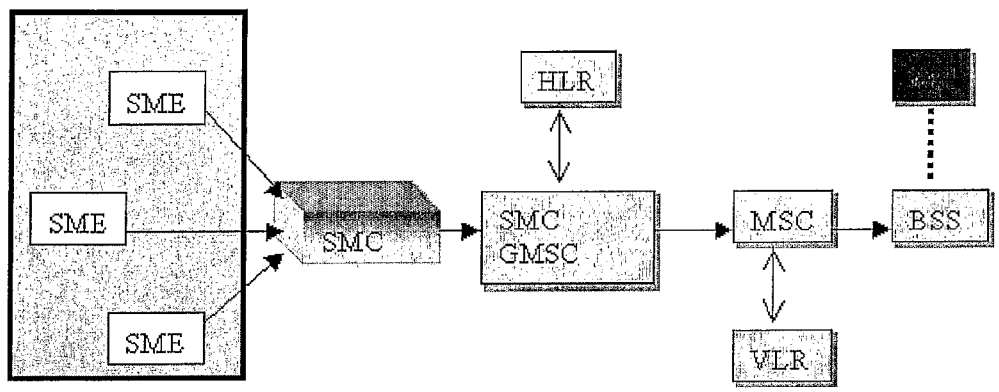
FIG. 1 is a schematic diagram illustrating a system for implementing an SMS messaging system.
Figure 3:
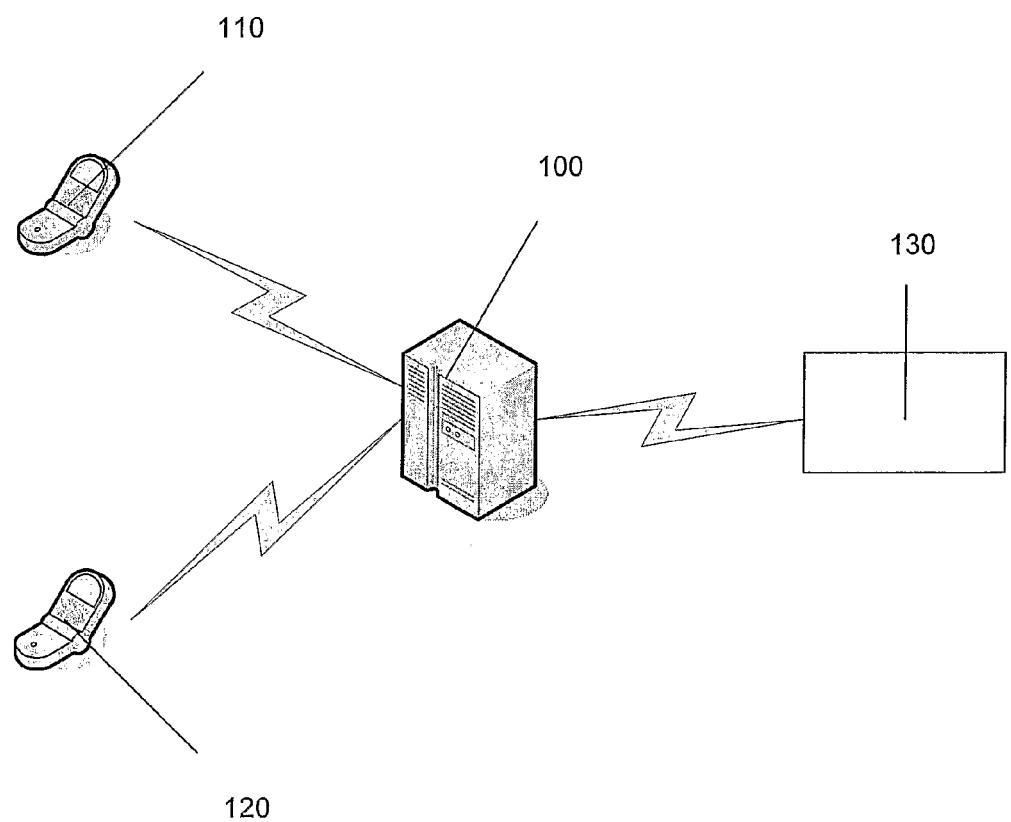
FIG. 3 is a schematic diagram illustrating a system according to an embodiment of the present invention; and, FIGS. 4 to 7 illustrate the flow of data and actions taken in various embodiments of the present invention.

FIG. 3 is a schematic diagram illustrating a system according to an embodiment of the present invention.

The system includes a node 100 acting as a short message service centre (SMSC) that is arranged to receive and process SMS messages from one or more mobile telephones 110, 120. Optionally, the system includes a further processing system 130.

An application running on the mobile telephone 110 creates an SMS message and embeds data in the validity period field of the message as discussed above in FIG. 2.

The SMSC 100 is arranged to monitor received SMS messages and, if an SMS message is received with data embedded within the validity field, the SMSC 100 is arranged to process the SMS message in dependence on the embedded data.

Standard SMS messages, such as an SMS message transmitted from mobile telephone 120 to mobile telephone 110 in which the message body includes a message such as "are you free for lunch?" does not have data embedded in the validity period and would be routed normally by the SMSC 100.

Processing by the SMSC 100 of SMS messages that include data embedded in the validity field 20 will be dependent on the configuration of the SMSC 100 and also the content of the data that is embedded. Examples of types of embedded data content and processing actions by the SMSC 100 are discussed below in more detail. However, as examples, the SMSC 100 may:

apply a different charging tariff to SMS messages having certain identifiers set in the embedded data;

raise a charge against the account associated with the mobile telephone transmitting the SMS message (the charge being stated or referenced in the embedded data);

perform an action authorized by the account holder of the mobile telephone transmitting the SMS message; or provide a service to the mobile telephone transmitting the SMS message (the service being stated or referenced in the embedded data).

Depending on configuration and the processing action requested, the SMSC 100 may subsequently deliver the SMS message to its stated recipient, drop the SMS message, reply to the sender with an acknowledgement SMS message or perform an action with reference to the stated recipient of the SMS message.

The SMSC 100 may perform the above actions itself, with reference to the further processing system 130 (which may for example be a database) or it may pass the SMS message or embedded data to the further processing system 130 for action.

In the case of use in a standard SMSC, implementation of an embodiment of the present invention merely requires introduction of a subroutine or process to check for the embedded data and take the necessary action (or pass the message or embedded data elsewhere for action).

Before dealing with the encoding of format of the embedded data, it is necessary to consider the data needed for normal operation of the validity period field.

A validity period format field is used in SMS messages to inform the SMSC as to the format of the validity period. The TP-Validity-Period-Format is a 2-bit field, located within bit no 3 and 4 of the first octet of an SMS-SUBMIT message. The following values may be used:

| bit4 | bit3 | |
|---|---|---|
| 0 | 0 | TP-VP field not present |
| 1 | 0 | TP-VP field present and integer represented (relative) |

-continued

| bit4 | bit3 | |
|---|---|---|
| 0 | 1 | Reserved |
| 1 | 1 | TP-VP field present and semi-octet represented (absolute) |

Any reserved values may be rejected by the SMSC.

The TP-Validity-Period field is given in either integer or semi-octet representation. In the first case, the TP-Validity-Period comprises 1 octet, giving the length of the validity period, counted from when the SMS-SUBMIT is received by the SMSC. In the second case, the TP-Validity-Period comprises 7 octets, giving the absolute time of the validity period termination.

In the first case, the representation of time is as follows:

| TP-VP value | Validity period value |
|---|---|
| 0 to 143 | (TP-VP + 1) × 5 minutes (i.e. 5 minutes intervals up to 12 hours) |
| 144 to 167 | 12 hours + ((TP-VP − 143) × 30 minutes) |
| 168 to 196 | (TP-VP − 166) × 1 day |
| 197 to 255 | (TP-VP − 192) × 1 week |

In the second case, the representation of time is represented as below—

| | Year: | Month: | Day: | Hour: | Minute: | Second: | Time Zone |
|---|---|---|---|---|---|---|---|
| Digits: (Semi-octets) | 2 | 2 | 2 | 2 | 2 | 2 | 2 |

An example SMS message including embedded data in accordance with one embodiment of the present invention may include:

the validity period format set to be in absolute time (11) providing 7 octets for the validity period field;

Validity Period field octet 1: the validity period set at a predetermined value greater than known maximum validity periods of the SMSC operated by most carriers. In all cases, setting the year field to more than five years from now will ensure this.

Validity Period field octets 2-7 (content octets): embedded data.

Octets 2-7 (referred to as content octets) are used to embed control data for use by the alternative application and the content data. The control data may provide added security, and may also include an identifier for the type of information for the rest of the data. The content data might be a tag indicating that the SMS message should be free, it may identify parameters or other details for the service requested, it may indicate details of a transaction payment request that the mobile telephone holder is being asked to authorize (and thereby pay via his or her mobile telephone account), or it might include the actual bill to be charged for the particular message. The data could also include various other data that could be used by the process or subroutine in the SMSC. It could also include information that may be used by other applications outside the SMSC.

The above can be implemented efficiently in software, hardware or a combination of the two. Only a quick check of TP-Validity-Period-Format field is necessary to decide if further processing is needed. A vast majority of SMS messages will not have this TP-Validity-Period-Format field set to 11 and can be ignored by the additional subroutine. The user need not be aware of this additional information attached with the message and so is not likely to erroneously corrupt it.

Rather than set octet 1 to anything greater than five years, it is possible to use a formula such as involving the current year, unique information relating to the customer handset, unique information relating to the network provider (for example: "current year+5+last digit of unique SIM number of the MS+last digit of unique number associated with the service provider network"). The combination of such information will enable use of the year field as a dynamic signature telling the SMSC to process the rest of the data using its subroutine. Such a dynamic signature will prevent abuse of the system.

In one embodiment of the present invention, software in the mobile telephone is used to indicate the SMSC to be used for a particular SMS message (and potentially override the mobile telephone's default SMSC). The SMSC number is usually hard-coded within the SIM card of the mobile phone and it follows the format of a E.164 format number for eg. +447785016005.

This means that even if the default SMSC provided by the normal service provider does not run the process or subroutine needed to identify and process the embedded data, we could instruct the SMS to be sent to an SMSC that can. The dynamic changing of the SMSC number to be used could be achieved by an application running on the mobile phone or by sending the consumer an installation file that would contain this information.

Example Applications

1. SMS Variable Charging:

In the case of variable charging for SMS messages, we need to encode Transaction Type, Amount and Entity.

Content octet 2 or a variable set of bits is used to encode transaction type and stage.

For example:
- a. No billing=0x11 (hexadecimal)—used for free sponsored SMS
- b. Reverse billing Propose=0x21—use for a merchant to propose that you pay for your goods via reply
- c. Reverse billing Accept=0x22—used by the client to reply The next two content octets or any variable set of bits may be used to specify the Amount to be billed ex 0x0302—means 48 Sing$ where the left most 12 bits encode the amount and the right most 4 bits encode currency. Any similar scheme may be used.

The final 3 content octets or any other set of bits specify the unique identifier of the entity to whom the bill applies. 3 octets can encode up to approximately 16 million unique identifiers. In the case of a merchant the number will be a unique ID in the system—One per transacting entity. These IDs may be dynamically created or pre registered as seen fit.

A different set of bits for the three fields—transaction type, amount and, entity may be used. For example, we may use only the first 4 bits for transaction ID, the next 16 bits for amount and currency and the remaining 28 bits for Entity—giving us around 260 million unique identifiers.

Some use cases for variable charging are illustrated below
Free Sponsored SMS:

The Mobile Subscriber (MS) may be provided a custom SMS capable client that includes the option of displaying advertisements when the user is entering or sending an SMS message in return for free or subsidized SMS messaging services. In this case, the content octets would contain:
- Transaction Type=0x02 (sponsored by ad)
- Transaction amount=0x001F (not really an amount, F stands for ad show, 001 means banner ad shown user did not click)
- Affected Entity=id of advertiser the SMSC will use this to finally bill the advertiser.

Where the custom SMS client is not used, or the display of adverts is inhibited, the client could be programmed to do none of the above. Thus the SMSC would charge the user as per normal for his SMS.

Purchase from Merchant:

The mobile telephone subscriber (MS) requests a shopkeeper that he wishes to pay for an item via his mobile telephone.

The Shopkeeper sends a message to the MS' mobile telephone offering to accept purchase by payment via mobile phone.

The parts of the content octets are
- Transaction Type=0x31 (bill recipient propose)
- Transaction amount=0x0091 (9 Singapore dollars)
- Affected Entity=0x3142345 (merchants id)

Under normal operation, the header fields would be removed at the SMSC 100 before onward transmission to the recipient mobile telephone. However, in this embodiment, the SMSC 100 is arranged to direct the message including the header fields to an alternate port on the mobile telephone.

A client application running on the MS' mobile telephone is associated with the alternate port to obtain the messages from the SMSC. Upon receipt of a message, the client application identifies the embedded data in the SMS message and displays the appropriate transaction proposal to the user for acceptance. Upon acceptance, the client application sends an SMS message to the shopkeeper including content octets
- Transaction Type=0x32 (transaction accepted)
- Transaction amount=0x0091 (9 Singapore dollars)
- Affected Entity=0x3142345 (merchants id)

As an alternative to sending the message and header to the alternate port, the SMSC may be arranged to copy the appropriate parts of the header fields into the message body and transmit the message body to the alternate port. Another alternative would be to use an alternate communication mechanism between the SMSC and mobile telephone such as a GPRS connection to relay the appropriate header information to the client application.

The system described can be used to enable various kinds of m-commerce and enable mobile application providers to charge a mobile telephone for their products or services without resorting to complex billing arrangements or pre-registration schemes.

The system could enable mobile commerce applications. If the user bought some goods, for example clothes, and wished to be charged through his mobile phone, the vendor could send a special receipt package to the mobile phone user. On opening the receipt, the user would be prompted to send an SMS which already had the relevant bill embedded in its header. This would complete the payment transaction.

In the above example, it is possible that the consumers default SMSC did not run the special subroutine to recognize the embedded data. In this case, the receipt package sent to the consumer would also contain the E.164 number of a SMSC that was modified to recognize the same. Thus the SMS which would be constructed by the user would automatically be sent to a processing centre that would be able to extract the embedded billing information.

In the examples discussed above, we obtain six octets in SMS messages for embedding data that is hidden from the user and can be filled by the mobile subscriber's client and inspected by a receiving SMSC to trigger alternate applications or uses for SMS messages.

In order to extend the amount of information that can be encoded in the six bytes of content octets made available, preferred embodiments of the present invention use the content octets to store a unique 6 octet Transaction ID.

The transaction ID is used to lookup additional information associated with the transaction. Using a conventional relational database we can make this Transaction ID the key to lookup any arbitrary data.

A simple schema could be

| Transaction Table | |
|---|---|
| TransactionID | Timestamp |

| Transaction Attribute Table | | | |
|---|---|---|---|
| TransactionID | Name | Value | Timestamp |

TransactionID are generated using a cryptographically secure random number generator. A simple way is to take the SHA1 hash of data collected from /dev/random from a Linux machine and to use only the last 6 bytes.

After generating a Transaction ID we need to check that it doesn't exist in our system, in the unlikely event it does, we generate another one. Our active tables are archived to remove finished transactions after a period of time so the probability of being able to guess an active transaction ID is low enough to be considered impossible for brute force over a wireless network.

The name and value fields in the Transaction attribute table can be used to attach arbitrary information with the transaction.

As an example for the case of purchase from a merchant
We have the Transaction tables as

| Transaction Table | |
|---|---|
| TransactionID | Timestamp |
| 0x000000000001 | Jan 1 2007 23:45:56 |

| Transaction Attribute Table | | | |
|---|---|---|---|
| TransactionID | Name | Value | Timestamp |
| 0x000000000001 | Type | Bill recipient | Jan 1 2007 23:45:56 |
| 0x000000000001 | Amount | 32 | Jan 1 2007 23:45:56 |
| 0x000000000001 | Currency | S$ | Jan 1 2007 23:45:56 |
| 0x000000000001 | Originator Type | Merchant | Jan 1 2007 23:45:56 |
| 0x000000000001 | Origin Entity | Cooked food | Jan 1 2007 |

-continued

| Transaction Attribute Table | | | |
|---|---|---|---|
| TransactionID | Name | Value | Timestamp |
| 0x000000000001 | Target | Company +65 9089897 | 23:45:56 Jan 1 2007 23:45:56 |

The merchant sends an SMS to the mobile subscriber with the TransactionID in the Content Octets. Software running on the merchant's phone or on any computer used by the merchant can directly contact a predetermined remote system to fetch a transaction ID after providing the required details.

After the client replies with an SMS to accept the tables are updated as shown below:

| Transaction Table | |
|---|---|
| TransactionID | Timestamp |
| 0x000000000001 | Jan 1 2007 23:45:56 |

| Transaction Attribute Table | | | |
|---|---|---|---|
| TransactionID | Name | Value | Timestamp |
| 0x000000000001 | Type | Bill recipient | Jan 1 2007 23:45:56 |
| 0x000000000001 | Amount | 32 | Jan 1 2007 23:45:56 |
| 0x000000000001 | Currency | S$ | Jan 1 2007 23:45:56 |
| 0x000000000001 | Originator Type | Merchant | Jan 1 2007 23:45:56 |
| 0x000000000001 | Origin Entity | Cooked food Company | Jan 1 2007 23:45:56 |
| 0x000000000001 | Target | +65 9089897 | Jan 1 2007 23:45:56 |
| 0x000000000001 | Target Accepted | True | Jan 1 2007 23:47:00 |
| 0x000000000001 | Transaction status | Closed | Jan 1 2007 23:47:00 |

The application on the client mobile telephone uses the Transaction ID in the content octets of the SMS to fetch the details for the transaction from the remote system (if it has internet connectivity) and replies with an SMS message that has the same transactionID to confirm acceptance. Mere reply of the SMS with the transaction ID may be considered sufficient to close the transaction.

The use of the transaction ID does not exclude us from adding information to the body of the SMS message, it also allows for the client to request additional info for the requesting entity if so desired and to present it.

We can make the clients authorization of the transaction more secure by making the client send back a cryptographic sign of the transaction ID. Some methods are illustrated below a. Mobile Subscriber receives SMS of request for payment with Transaction ID b. MS accepts SMS and replies to authorize. This may be facilitated by Affle software running on the mobile telephone device which can intercept and manage SMS and provide a suitable user interface for the person using the device.

c. Since the MS uses our client software we send back a an SMS where the Transaction ID is a cryptographic hash of the original Transaction ID+clients IMEI+Clients IMSI.

d. Our software running with the Mobile Service Provider recognizes the new transaction ID as it has already pre-computed it. We have stored the clients IMEI and IMSI no. Once the Transaction ID is seen, the transaction is closed.

e. Alternatives and additions to IMEI+IMSI such as a client specific password also stored on our servers can be used. As can more complex public key schemes to generate a new transaction ID.

Each user may be required to pre-register with the remote system. A simple way for a merchant to confirm the identity of a mobile telephone subscriber wishing to pay via mobile telephone at the point of sale is for registration to require a photo of the user to be provided. When authenticating the user, the photo may be provided from the remote system to the merchant's point of sale terminal.

Figure 4:
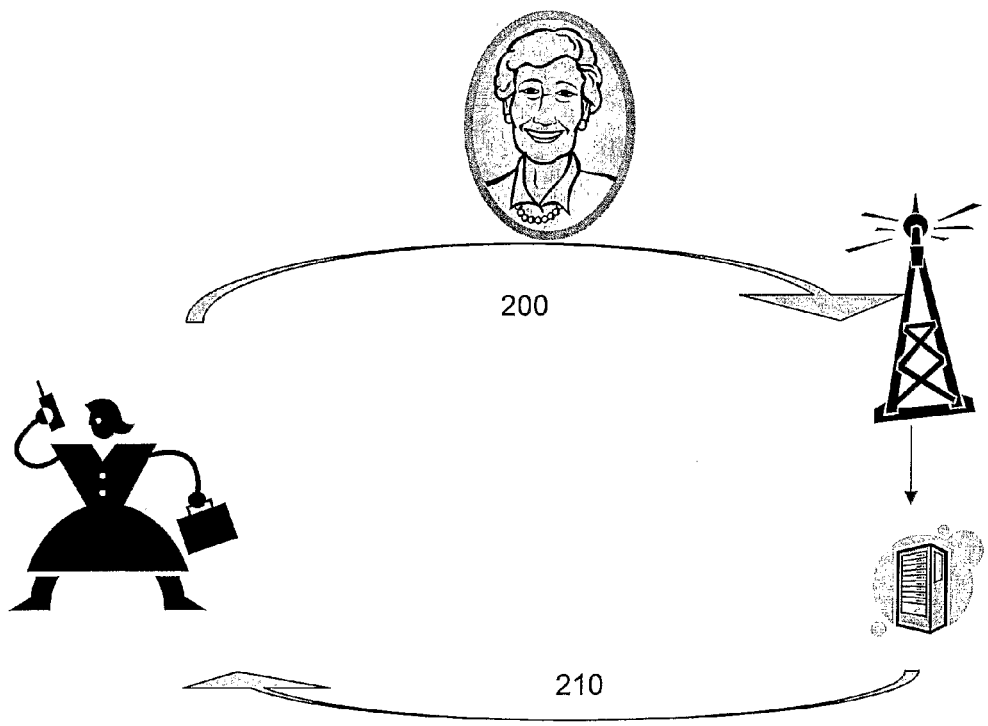

Registration may happen as in the process illustrated in FIG. 4:

In step 200, a user sends a SMS to a special number to register. If the user has a phone camera and MMS then the user is required to send a picture of self to register instead of plain SMS.

In step 210, a WAP push of client software is made to the user's mobile telephone handset. The Software asks the user a few more questions related to his profile like age and interests and then updates a remote profile database with information. If the user registered with SMS and no photo and the software detects that the phone is capable of photography and MMS, it forces the user to take a photo and uploads it to the remote profile database.

Figure 5:
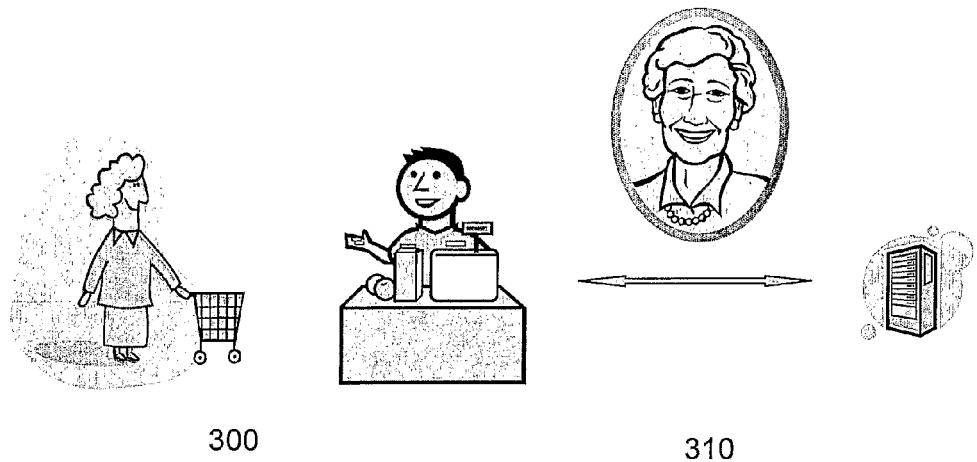

As illustrated in FIG. 5, when a merchant is requested in step 300 to bill the user's mobile telephone for goods or services, he can contact the remote profile database in step 310 to obtain profile data and verify the user with his photo if the user is in front of him. Additional profile items like age etc may also be useful for verification.

Figure 6:
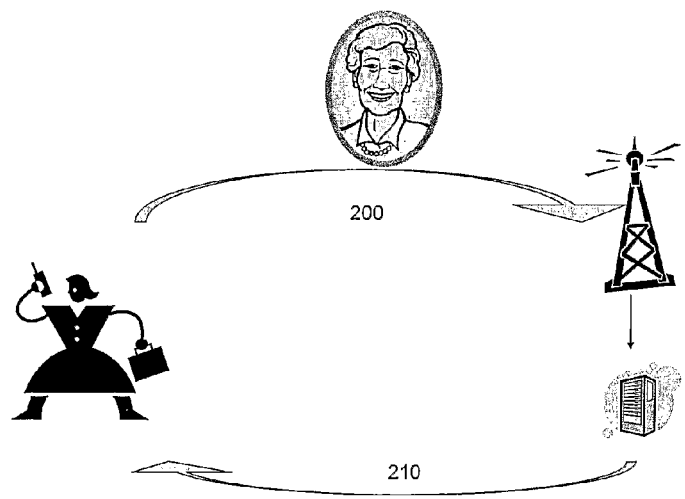

Optionally, as illustrated in FIG. 6, a merchant's point of sale may be configured to accept a user's phone number via a keypad in the same manner as a PIN number is currently entered for chip and pin credit cards.

In step 300, when a user asks a Merchant to charge goods or services to her Phone bill she need not reveal her phone number to the merchant. The merchant's Point of Sale (POS) contacts a remote system in step 310 to interrogate the profile database. In step 320, the user enters his or her phone number on a PIN keypad attached to the POS. The POS contacts the remote system to complete the rest of the transaction without revealing the phone number to the Merchant. The user can optionally register a PIN to be used instead of using the phone number as the PIN for transactions. Alternatively, the phone number and a PIN may be needed to authenticate transactions. In one embodiment, the POS system includes a Blue-Tooth (RTM), RFID or similar communication system that is arranged to communicate with the user's mobile phone to obtain the phone number or another unique identifier, thereby avoiding the user typing in the number. In such an arrangement, client software and/or hardware on the mobile phone may be provided to allow the user to authorize release of the phone number by this mechanism. In the case of authentication via a PIN alone, the remote system is able to do the lookup from PIN to mobile telephone number.

Figure 7:
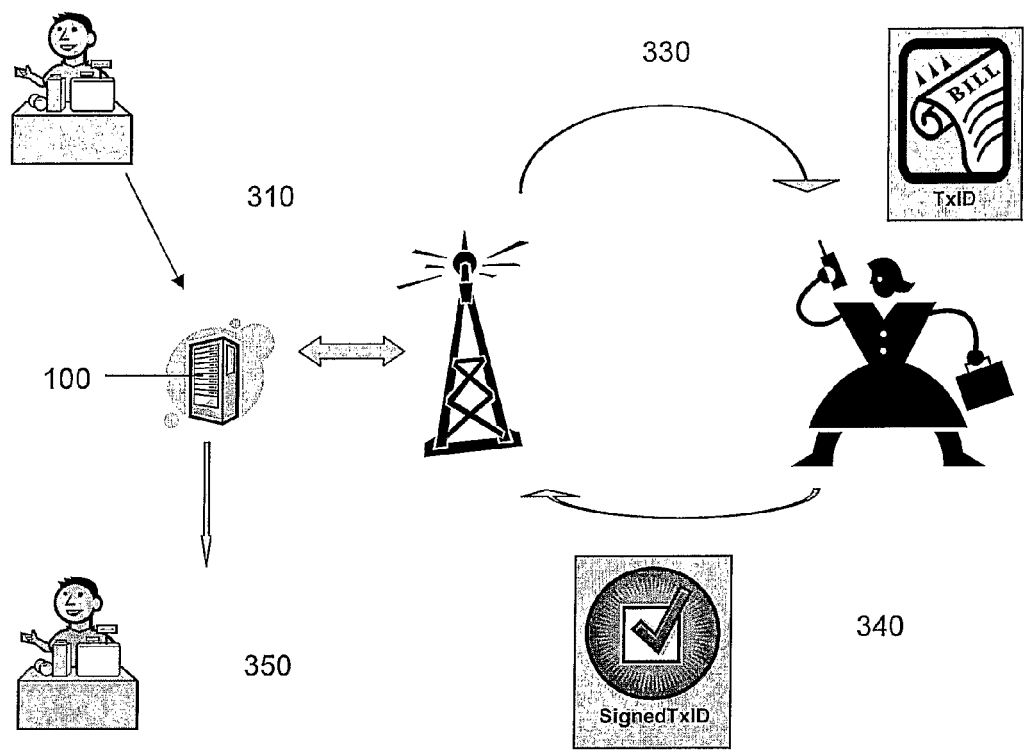

A complete transaction is illustrated in FIG. 7. In step 310 a transaction authorization request is sent to the SMSC 100. The user's mobile telephone will have been provided in one of the ways discussed above. In either case, once the phone number is obtained and the user authenticated, an SMS message is sent in step 330 to the user's mobile telephone as discussed above enabling acceptance and billing in the manner discussed. Upon acceptance by the user, an acceptance SMS message is sent from the user's mobile telephone in step 340 and, upon receipt, the SMSC 100 sends a transaction success message to the merchant in step 350.

Whilst SMS communications are the preferred messaging system transport mechanism for the present invention, it will be appreciated that other similar messaging system transport mechanisms exist or could be created using existing technology that are also applicable for use by embodiments of the present invention.

The invention claimed is:

1. A method for extending the use and/or application of a messaging system including:
    embedding transaction ID data within a validity period field of a header of a message, said transaction ID data comprising data that is unrelated to the validity period of the message;
    setting a further portion of the header to a value causing at least part of said validity period field to be ignored by the messaging;
    transmitting the message via the messaging system; and,
    identifying the embedded transaction ID data in the validity period of the header of the message and processing the message differently to messages without the transaction ID data,
    wherein the messaging system comprises an SMS, MMS or EMS messaging system.

2. A method according to claim 1, wherein said transaction ID data comprises one or more of:
    data operative to cause application of a different charging tariff to the message;
    a charge to be raised against the account associated with the originating terminal of the message;
    instructions for performance of an action authorized by the originator of the message; and
    a request for provision of a service to the originating terminal of the message.

3. A method as claimed in claim 1, wherein said transaction ID data comprises a link to a record in a remote repository, the method further comprising accessing the remote repository via said link and determining said processing required in dependence on the record.

4. A method according to claim 3, wherein identifying the embedded transaction ID data in the validity period field of the header of the message and processing the message differently to messages without the transaction ID data includes one of:
    dropping the message; and
    replying to the originating terminal with an acknowledgement message.

5. A method as claimed in claim 1, further comprising sending the message from a merchant. the transaction ID data comprising a request for payment of a transaction and the transaction being at the request of the recipient of the message, wherein the step of identifying the embedded transaction ID data in the validity period field of the header of the message and processing the message differently to messages without the transaction ID data further comprises identifying the request for payment of a transaction and prompting the recipient to authorize payment.

6. A method as claimed in claim 5, further comprising entering data via a secure terminal enabling the merchant to send the message.

7. A messaging system comprising:
- a mobile telephony device messaging application arranged to embed transaction ID data within a validity period field of a header of a message and set a further portion of the header to a value to cause at least part of said validity period field to be ignored by a first node in the messaging system;
- wherein the transaction ID data is arranged to cause processing of said message differently to messages without said transaction ID data in a second node of the messaging system, and
- wherein the messaging system comprises an SMS, MMS or EMS messaging system.

8. A messaging system according to claim 7, wherein said transaction ID data comprises one or more of:
- data operative to cause said messaging system to apply a different charging tariff to the message;
- data operative to cause said messaging system to raise a charge against the account associated with the originating terminal of the message;
- instructions arranged to cause said messaging system to perform an action authorized by the originator of the message; and
- instructions arranged to cause said messaging system to provide a service to the originating terminal of the message.

9. A messaging system as claimed in claim 7, further comprising a remote repository, wherein said transaction ID data comprises a link to a record in said remote repository, the messaging system being arranged to access the remote repository via said link and determine said processing required in dependence on the record.

10. A messaging system as claimed in claim 7, further comprising a merchant terminal and a user terminal, wherein upon performance of a transaction for said user, the merchant terminal is arranged to embed transaction ID data comprising a request for payment of the transaction into the validity period field of a header of a message and transmit said message to the user terminal, the messaging system being arranged to identify the embedded transaction ID data in the validity period field of the header of the message and prompt the user terminal for authorization to pay said transaction, wherein upon receipt of authorization to pay said transaction from said user terminal, the messaging system is arranged to charge an account associated with the user terminal.

11. A messaging system as claimed in claim 10, wherein said user terminal comprises a mobile telephone.

12. A messaging system as claimed in claim 10, wherein said merchant terminal further comprises a secure terminal arranged to accept an identifier identifying said user terminal, wherein the merchant terminal is arranged to transmit the message in dependence on the identifier.

13. A messaging system as claimed in claim 10, further comprising a remote profile system and a client application, wherein upon installation of the client application on the user terminal, the client application is arranged to obtain profile data and populate a profile record in said remote profile system for the user.

14. A messaging system as claimed in claim 13, wherein if said user terminal includes an image capture device, the client application is arranged to obtain an image of the user for said profile record, the merchant terminal being arranged to access said profile record and display an image of said user for authentication of the user during payment of said transaction.

* * * * *